Patented Dec. 27, 1927.

1,654,290

UNITED STATES PATENT OFFICE.

IVAN GUBELMANN, OF SOUTH MILWAUKEE, WISCONSIN, ASSIGNOR TO THE NEWPORT COMPANY, OF CARROLLVILLE, WISCONSIN, A CORPORATION OF DELAWARE.

PARA'-AMINO-ORTHO-BENZOYL-BENZOIC ACID AND PROCESS OF MAKING THE SAME.

No Drawing.    Application filed December 8, 1926.   Serial No. 153,468.

This invention relates to para'-ortho-benzoyl-benzoic acid and to a process of making the same.

Para'-amino-ortho-benzoyl-benzoic acid is isomeric with other known amino-ortho-benzoyl-benzoic acids, such as: ortho-benzoyl-meta-amino-benzoic acid, described in Chemische Zentralblatt 1908 (2) page 1028; ortho-benzoyl-para-amino-benzoic acid, Berichte 38, page 296; ortho-benzoyl-ortho-amino-benzoic acid, Jr. Amer. Chem. Soc. 42, page 1871; ortho-amino-ortho-benzoyl-benzoic acid, Chemische Zentralblatt 1913 (I), page 1481; meta'-amino-ortho-benzoyl-benzoic acid, Chemische Zentralblatt 1904 (I), page 329. The para'-amino-ortho-benzoyl-benzoic acid, however, has not to the best of my knowledge been described in the literature.

I have now found that para'-amino-ortho-benzoyl-benzoic acid can be obtained by the replacement of the halogen group in para'-halogen-ortho-benzoyl-benzoic acid by an amino group. The chemical reaction is expressed as follows, wherein (hlg) represents a halogen atom:

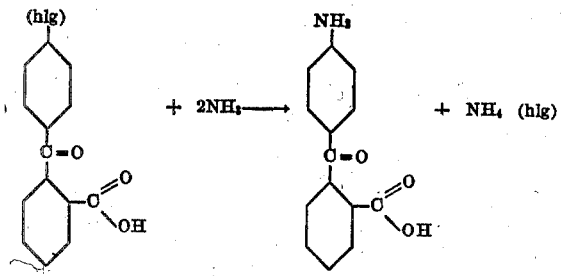

This replacement is accomplished by heating with ammonia under pressure and the reaction is greatly facilitated if copper or a copper salt is used as catalyst.

When in a pure state, para'-amino-ortho-benzoyl-benzoic acid is a white substance, becoming slightly cream colored on exposure to air. It melts with slight decomposition at 200° C. It is sparingly soluble in benzene, xylene or chloro-benzene at ordinary temperatures, but is readily soluble in alcohol, glacial acetic acid and nitro-benzene. It is slightly soluble in cold water, but appreciably so in dilute hydrochloric acid. In concentrated sulphuric acid, it dissolves readily, imparting a red brown color to the solution. It readily forms an acetyl derivative with a melting point of 277° C. With aqueous ammonia, caustic soda and caustic potash solutions, the corresponding salts are formed, which are very soluble in cold water.

Without limiting my invention to any particular procedure, the following example, in which parts by weight are given, illustrates the application of my invention in the preferred form.

10 parts of the sodium salt of para'-chloro-ortho-benzoyl-benzoic acid are mixed with 80 parts of 26% aqueous ammonia and .5 parts of copper sulphate as catalyst. The mixture is then heated to 180–185° C. using a pressure autoclave provided with an agitator, and this temperature is maintained for eighteen hours. At this temperature, the pressure will approximate 450 pounds. At the end of this period the reaction mass is cooled and the excess ammonia distilled off. The mass is now made distinctly alkaline with caustic soda, boiled and filtered hot. The filtrate is cooled and slowly added to 100 parts of 3% cold hydrochloric acid. The whole is warmed to 45° C. and filtered to remove any insoluble residue. The filtrate is now exactly neutralized with caustic soda, cooled and the para'-amino-ortho-benzoyl-benzoic acid filtered off. This compound is purified by recrystallization from water. It may also be purified by dissolving in a minimum quantity of hot 5% hydrochloric acid solution and cooling to separate out the hydrochloride of the compound.

I am aware that numerous details of the process may be varied through a wide range without departing from the spirit of this invention, and I do not desire limiting the patent granted hereon otherwise than as necessitated by the prior art.

I claim as my invention:

1. The process of preparing para'-amino-ortho-benzoyl-benzoic acid, which comprises heating para' halogen-ortho-benzoyl-benzoic acid with aqueous ammonia under pressure.

2. The process of preparing para'-amino-ortho-benzoyl-benzoic acid, which comprises heating para' halogen-ortho-benzoyl-benzoic acid with aqueous ammonia under pressure in the presence of a catalyst.

3. The process of preparing para'-amino-ortho-benzoyl-benzoic acid, which comprises heating para'-halogen-ortho-benzoyl-benzoic acid with aqueous ammonia under pressure in the presence of a copper catalyst.

4. The process of preparing para'-amino-ortho-benzoyl-benzoic acid, which comprises heating para'-chloro-ortho-benzoyl-benzoic acid with aqueous ammonia under pressure in the presence of copper as catalyst.

5. As a new article of manufacture, para'-amino-ortho-benzoyl-benzoic acid having the following formula:

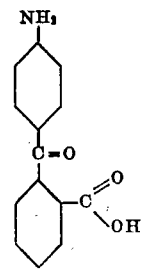

In testimony whereof I have hereunto subscribed my name.

IVAN GUBELMANN.